United States Patent [19]

Lisson

[11] Patent Number: 4,979,804
[45] Date of Patent: Dec. 25, 1990

[54] OPTICAL ASSEMBLY FOR CREATING A SYNTHETIC APERTURE

[75] Inventor: Jerold B. Lisson, Henrietta, N.Y.
[73] Assignee: Eastman Kodak Company, Rochester, N.Y.
[21] Appl. No.: 364,054
[22] Filed: Jun. 8, 1989
[51] Int. Cl.⁵ .......................... G02B 5/00; G02B 7/00; H01S 3/10
[52] U.S. Cl. ...................... 350/319; 372/21
[58] Field of Search .................. 350/319–321, 350/163, 166, 354; 356/363, 153; 372/21, 94, 96, 103, 108

[56] References Cited

U.S. PATENT DOCUMENTS

| | | | |
|---|---|---|---|
| 4,267,524 | 6/1981 | Paxton et al. | 372/103 |
| 4,553,244 | 11/1985 | Benedict et al. | 372/108 |
| 4,682,339 | 7/1987 | Sziklas et al. | 372/103 |
| 4,833,683 | 5/1989 | Ory et al. | 372/21 |
| 4,847,521 | 7/1989 | Huignard et al. | 372/21 |
| 4,867,534 | 9/1989 | Schoen | 350/319 |

Primary Examiner—Bruce Y. Arnold
Assistant Examiner—Thong Nguyen
Attorney, Agent, or Firm—Stephen C. Kaufman

[57] ABSTRACT

A non-linear optical assembly for creating a synthetic aperture. The assembly includes an external source of radiation; at least two discrete non-linear elements, each of which elements has a defined aperture for receiving radiation outputted by the source; and an optical feedback means in operative association with the non-linear elements, for optically self-coupling the elements so that the elements collectively define a synthetic aperture that is greater than the defined aperture for any single element.

11 Claims, 3 Drawing Sheets

OPTICAL ASSEMBLY FOR CREATING A SYNTHETIC APERTURE

CROSS-REFERENCE TO RELATED APPLICATIONS

This application is related to application Ser. No. 108,254 filed Oct. 13, 1987, by Lisson, now U.S. Pat. No. 4,846,575 and application Ser. No. 218,404, filed July 12, 1988, by Lisson et al. The entire disclosures of each of these applications are incorporated by reference herein. Each of these applications is copending and commonly assigned.

BACKGROUND OF THE INVENTION

1. Field of the Invention

This invention relates to an optical assembly, and in particular to a non-linear optical assembly for creating a synthetic aperture.

2. Introduction to the Invention

The usual classical treatment of an optical assembly—reflection, refraction, superposition, etc.—assumes a linear relationship between a source of electromagnetic radiation, and a responding and passive atomic system. With the recent advent of lasers, however, as a novel source of extremely intense light, and a concomitant development of active responding atomic (non-linear) elements, the consideration and exploitation of optical assemblies providing a non-linear capability has assumed great importance.

SUMMARY OF THE INVENTION

I have been working with optical assemblies that can incorporate a non-linear capability, for example, an assembly for monitoring the alignment of a workpiece, as disclosed in U.S. Pat. No. 4,846,575. This particular application has helped define a problem that, in fact, has general applicability, beyond the immediate invention of monitoring the alignment of a workpiece: the problem is increasing the optical sensitivity of the monitoring assembly, and more generally, enhancing the sensitivity of any optical assembly incorporating a non-linear capability.

Now, the optical sensitivity (i.e., the angular resolution of the optical assembly), is inversely proportional to the assembly's aperture size. The aperture size for non-linear assemblies, in turn, has heretofore been dependent on the size of the active responding atomic system, or non-linear element. As a practical matter, an important class of commercially available non-linear elements, namely those comprising single crystal barium titanate ($BaTiO_3$), has a relatively very small aperture size. For example, the largest discrete barium titanate crystals commercially available are limited to approximately $12 \times 12 \times 12$ mm$^3$ in size. Accordingly, these important and illustrative non-linear elements, having a relatively small aperture size, may operate to limit the optical sensitivity of the optical assembly that incorporates these crystals, since the assembly sensitivity, as stated, is inversely proportional to the relatively very small aperture size of the single crystal barium titanate.

I have now discovered a novel way to provide an optical assembly for creating a synthetic aperture, the synthetic aperture being qualitatively larger than that capable of being provided by a single, discrete non-linear element, for example, a single crystal barium titanate element. This discovery, in consequence, enables one to design and construct an optical assembly with an enhanced sensitivity or angular resolution, as compared to assemblies obliged to use only a single non-linear element.

In one aspect, the present invention provides an optical assembly for creating a synthetic aperture, which assembly comprises:

a. an external source of radiation;

b. at least two discrete non-linear elements, each of which elements has a defined aperture for receiving radiation outputted by the source; and c. an optical feedback means in operative association with the non-linear elements, for optically self-coupling the elements so that the elements collectively define a synthetic aperture that is greater than the defined aperture for any single element.

BRIEF DESCRIPTION OF THE DRAWINGS

The invention is illustrated in the accompanying drawings, in which:

FIG. 1A shows an optical assembly utilizing a single, non-linear element aperture; FIG 1C shows an assembly utilizing two independent, non-linear elements; and FIG. 1E shows an assembly in accordance with a first embodiment of the invention utilizing two non-linear elements and optical feedback coupling. FIGS. 1B, 1D and 1F show respective irradiation patterns for the assemblies of FIGS. 1A, 1C and 1E.

FIG. 2A shows an optical assembly utilizing an array of more than two non-linear elements; FIG. 2B shows an assembly utilizing fiber optics; and FIG. 2C shows an assembly utilizing a second laser.

FIG. 3A shows monitoring without.

DETAILED DESCRIPTION OF THE INVENTION

Preferred aspects of the components of the present optical assembly are first disclosed, followed by a discussion of its operation and utility.

The optical assembly of the present invention preferably comprises an external source of radiation that is at least partially coherent, for example, a laser source.

The optical assembly requires at least two discrete non-linear elements. The non-linear elements may comprise any elements whose properties are affected by the characteristics of waves that are incident upon it from the external source of radiation, so as to manifest a non-linear effect, for example, producing a phase-conjugate wave. Suitable non-linear elements include single crystal barium titanate crystals ($BaTiO_3$), of the type commercially available from Sanders Associates, Nashua, N.H.; elements comprising single crystal barium strontium niobate; or elements comprising Urea, 2-methyl-4-nitro-aniline (MNA).

The optical assembly requires an optical feedback means in operative association with the non-linear elements. The optical feedback means may comprise alternatively, a conventional mirror; a fiber optic; a reflective diffraction grating; or an external (second) laser source, so directed at the non-linear elements as to create a resonant cavity between the elements, the resonant cavity thereby inducing an optical coupling between the non-linear elements.

The operation of an optical assembly of the present invention is disclosed by way of an unfolding series of drawings, FIGS. 1A-F.

Figure 1A:
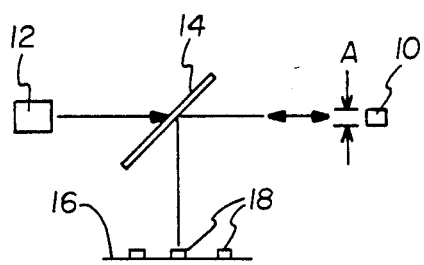
FIGS. 1A–F explain the operation of an optical assembly of the present invention
Figure 1B:
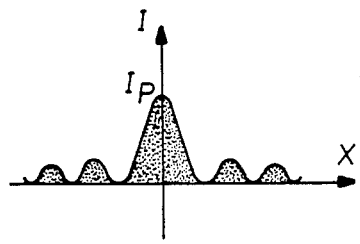

FIG. 1A includes a non-linear element comprising single crystal barium titanate (BaTiO$_3$) defining an uncoupled, single crystal aperture of 3 mm to 15 mm. The deposited crystal 10 has an aperture of dimension A=3 mm. A source of radiation 12 comprising a helium-neon laser, operating at a wavelength of 6328 Angstroms, may be directed along the normal to the crystal 10 aperture, by way of a conventional beamsplitter 14. The beamsplitter 14, in turn, can redirect radiation reflected from the crystal 10 aperture, to a far-field interferometric plane 16. A conventional photo-diode array 18 may be mounted coincident with the interferometric plane 16, in order to detect and register a resulting irradiance pattern or image intensity distribution function, as shown in FIG. 1B. Note that the irradiance pattern is stable, and shows an intensity peak, $I_p$, as a function of a position x on the interferogram plane 16.

Figure 1C:
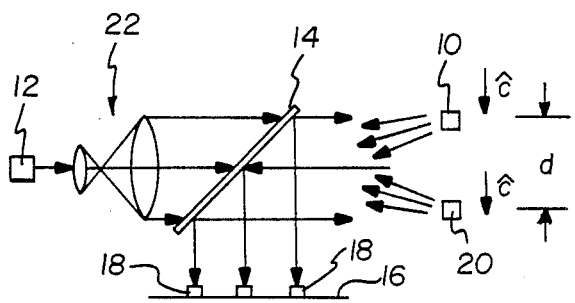

FIG. 1C replicates the FIG. 1A arrangement, with the addition of a second non-linear element 20 comprising single crystal barium titanate (BaTiO$_3$), aperture A=3 mm, positioned proximate the first crystal 10, at a distance d=6 meters. The second crystal 20 aperture faces the source of radiation 12 along the normal, as does the first crystal 10, as expedited by way of a conventional lens system 22.

Figure 1D:
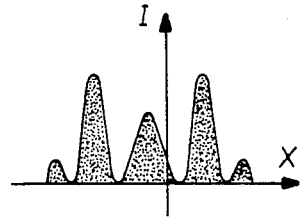

The orientation of the crystals 10, 20 (indicated by the notation c) with respect to each other and to the source of radiation 12, may not be conducive to a spontaneous, mutual, self-coupling optical energies between the crystals 10, 20. (Further instruction on these points is available in M. D. Ewbank et al., "Time Reversal by an Interferometer with Coupled Phase-Conjugate Reflectors," *Optics Letters*, Vol. 61, pp. 282-284 (June 1985), the disclosure of which is incorporated herein by reference.) This reflects the fact that a "viewfactor" for each of the crystals, as defined by their orientation, may preclude coupling (i.e., the crystals may not be included in each other's viewfactor). Accordingly, the reflected and transmitted radiation beams from the apertures of the independent crystals 10, 20, produce a combined irradiance pattern on the interferometric plane 16, of the type that is shown in FIG. 1D. Here, in contrast to FIG. 1B, there may be no intensity peak, and in fact, the irradiance pattern may not reveal a coherent pattern, but rather an unstable and time varying pattern. The FIG. 1D pattern indicates, to the contrary of FIG. 1B, that in the absence of a significant mutual self-coupling effect between the crystals 10, 20, or common viewfactor, there can be no significant "locking" of the relative phases of the reflected and transmitted radiation beams from independent crystal apertures. Hence, the pattern shown in FIG. 1D may not exhibit a stable intensity peak, an indicia of the complimentary effect of phase-locking. Restated, the independent, dual crystal arrangement shown in FIG. 1C, has an effective aperture that is only that of either one of the crystals.

Figure 1E:
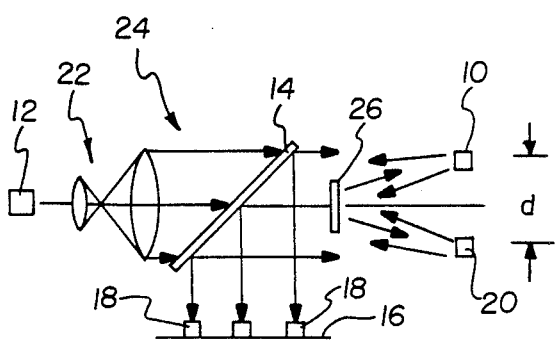
Figure 1F:
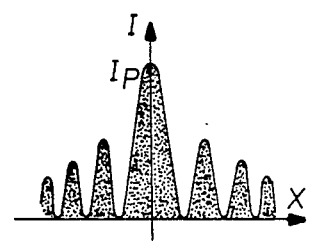

Attention is now directed to FIG. 1E, which shows an optical assembly 24 of the present invention, and includes an addition to the FIG. 1C arrangement, namely, an optical feedback means comprising a conventional mirror or reflective deffraction grating 26. The mirror or grating 26 is placed in operative association with the two crystals 10, 20, for optically self-coupling the crystals 10, 20 so that the crystals collectively define a synthetic aperture SA that is greater than the defined aperture A for any single crystal, 10 or 20. This operative association places each crystal in each other's viewfactor, and facilitates self-coupling.

A measure of the efficacy of "the placement in operative association", is the irradiance pattern produced at the interferometric plane 16. Here, the mirror or grating 26 has been optimally placed, so that the irradiance pattern shown in FIG. 1F has a stable intensity peak, similar to that shown in FIG. 1B for the single crystal, although with much greater resolution or sensitivity (i.e., a much narrower lobe width).

The coherent irradiance pattern that results from the FIG. 1E of optical assembly 24 indicates that, in contrast to the FIG. 1C arrangement, the crystals 10, 20, in the presence of the optical feedback means 26, can develop a substantial, mutual, self-coupling, optical oscillatory electromagnetic field between them. In turn, this self-oscillation between the pair of crystals 10, 20 has a profound effect on the two reflected beams at the interferogram plane 16—it locks their phase, thus producing a coherent irradiance pattern having a maximum main lobe intensity. The width of the main-lobe, in turn, is a function of the synthetic aperture created by the two crystals in combination. Thus, the effect of an overlapping viewfactor, as defined by the two crystal 10, 20 apertures, is such that the optical assembly 24 creates a synthetic aperture SA equal to the distance d=6 meters, separating the two crystals 10, 20. Comparing the apertures of FIGS. 1A, C, and E, therefore, it may be computed that the FIG. 1E synthetic aperture of the present invention is 2000 times greater than the aperture of either the single crystal FIG. 1A arrangement, or the independent, dual crystal FIG. 1C arrangement.

Figure 2A:
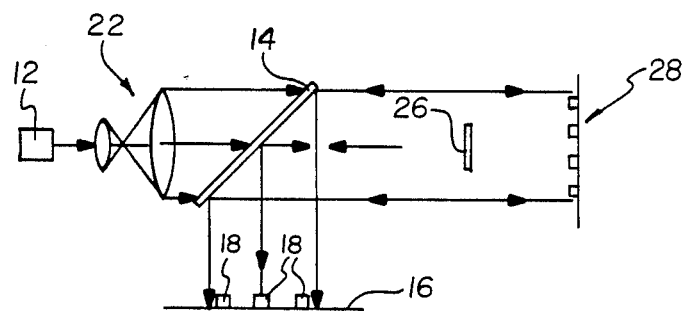
FIGS. 2A–C show alternative embodiments of the present invention.
Figure 2B:
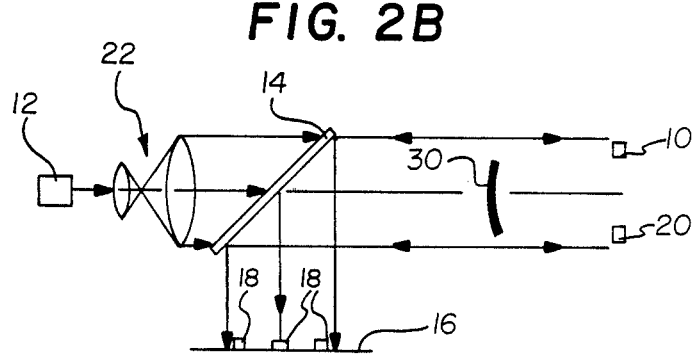
Figure 2C:
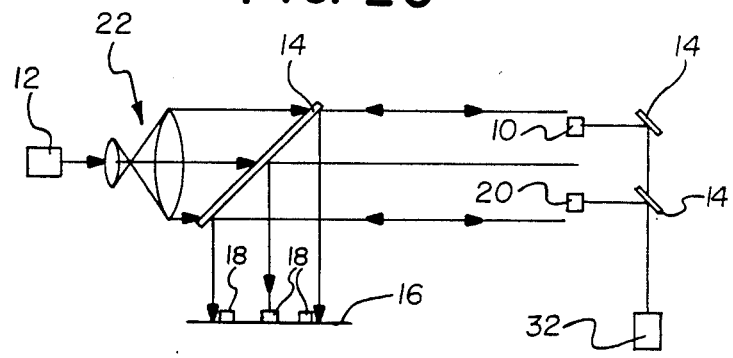

Attention is now directed to FIGS. 2A-C, which show alternative embodiments of an optical assembly of the present invention.

The FIG. 2A arrangement is similar to that shown in FIG. 1E, and includes a modification so that the two non-linear element configuration of FIG. 1E may be extended to an array of n non-linear elements 28, where n is greater than 2. The optical feedback means comprises the mirror 26, which functions to optically self-couple the n non-linear elements 28, so that the elements collectively define a synthetic aperture that is greater than the defined aperture for any single non-linear element in the array.

The FIG. 2B arrangement is similar to that shown in FIG. 1E, but the optical feedback means now comprises a conventional fiber optic element 30 in operative association with the non-linear elements 10, 20. The fiber optic element 30 can function to optically self-couple the non-linear elements 10, 20, so that the elements collectively define a synthetic aperture that is greater than the defined aperture for any single element. Restated, the fiber optic element 30 provides a means of developing a viewfactor in common to the disparate non-linear elements 10, 20.

The FIG. 2C arrangement is again similar to that shown in FIG. 1E, but includes a conventional external laser 32, so directed at the crystals 10, 20 as to create a resonant cavity between the crystals 10, 20. This action induces an optical coupling between the crystals 10, 20. In particular, the resonant cavity induces a standing-wave self-oscillatory phenomenon between the crystals 10, 20, where each of the crystals acts as a mirror, with gain for the other crystal.

Figure 3A:
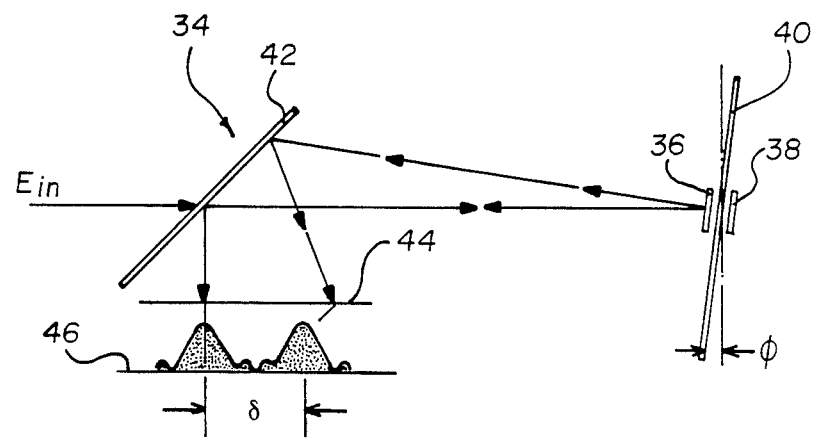
FIGS. 3A and B show how an optical assembly of the present invention may be utilized in an assembly for monitoring the alignment of a workpiece.

The utility of an optical assembly of the present invention may be demonstrated by showing its incorporation into an assembly for monitoring the alignment of a workpiece, of the type referenced in U.S. Pat. No. 4,846,578. FIG. 3A shows the '575 Patent alignment assembly without the indicated modification, and FIG. 3B shows the alignment assembly with the modification.

FIG. 3A, accordingly, shows an alignment assembly 34 comprising:
- a conventional mirror 36;
- a phase-conjugate mirror 38, comprising single crystal barium titanate, having an aperture A=3 mm.;
- a workpiece 40, whose alignment $\phi$ from a reference point is to be monitored;
- an input radiation beam E in;
- a conventional beamsplitter 42;
- a conventional lens 44; and
- a detector plane 46.

The operation of the alignment assembly 34 may be summarized, for our purposes, by noting that, given a tilt $\phi$ of the workpiece 40, a specular reflection from the mirror 36 cannot co-propagate back to the source with a phase-conjugate reflection from the phase-conjugate mirror 38. Thus, the two reflections, when imaged at the detector 46, will have separated intensity distributions. The spatial distance between the centers of the intensity distributions ($\delta$) is directly proportional to the tilt $\phi$.

Figure 3B:
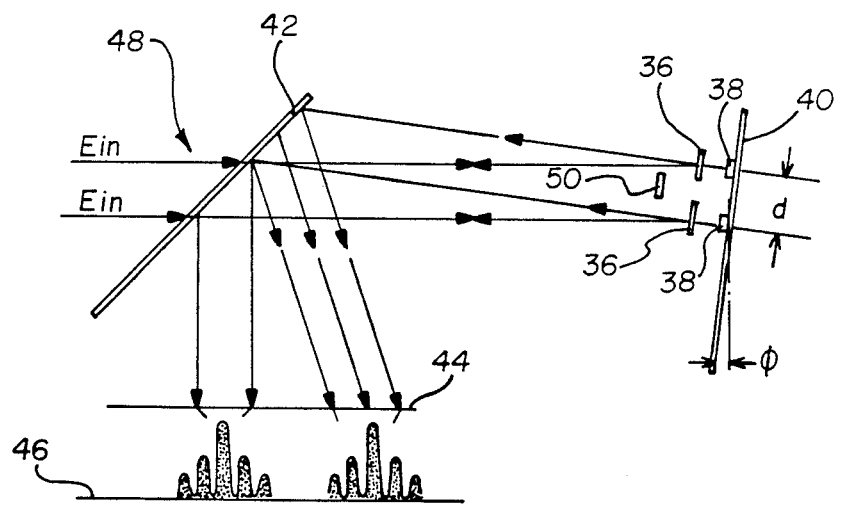
FIG. 3B shows monitoring with, an optical assembly in accordance with the invention.

FIG. 3B shows the FIG. 3A alignment assembly 34, but modified in accordance with the teachings of the present invention. In particular, a modified alignment assembly 48 shown in FIG. 3B includes two sets of subassemblies, comprising a conventional mirror 36 and a phase-conjugate mirror 38, placed apart a distance d=6 meters, where d is the synthetic aperture spacing. An optical feedback means 50 comprising a conventional mirror may be placed in operative association with the two subassemblies, so that the non-linear elements (i.e., the two single crystal barium titanate elements) collectively define a synthetic aperture SA=6 meters that is greater than the aperture A=3 mm of either non-linear element alone. The sensitivity of the alignment assembly 48 of FIG. 3B, i.e., its ability to monitor ever smaller tilt angles $\phi$, is 2,000 times greater than that in the FIG. 3A arrangement.

What is claimed is:

1. An optical assembly for creating synthetic aperture, comprising:
    a. an external source of electromagnetic radiation;
    b. at least two, spaced apart discrete non-linear elements, each of which elements has a defined aperture positioned for receiving radiation outputted by the source; and
    c. an optical feedback means, positioned relative to the non-linear elements and to the source so as to create a resonant cavity between the elements, for optically self-coupling the elements so that the elements collectively define a synthetic aperture that is greater than the defined aperture for any single one of the elements.

2. An optical assembly according to claim 1, wherein the source of radiation is at least partially coherent.

3. An optical assembly according to claim 2, wherein the source of radiation comprises a laser.

4. An optical assembly according to claim 1, wherein at least one of the elements comprises single crystal barium titanate.

5. An optical assembly according to claim 1, wherein at least one of the elements comprises barium strontium niobate.

6. An optical assembly according to claim 1, wherein at least one of the elements comprises single crystal barium titanate defining an aperture from 3 mm to 15 mm.

7. An optical assembly according to claim 1, wherein the optical feedback means comprises a conventional mirror.

8. An optical assembly according to claim 1, wherein the optical feedback means comprises a fiber optic.

9. An optical assembly according to claim 1, wherein the optical feedback means comprises a reflective diffraction grating.

10. An optical assembly according to claim 1, wherein the feedback means comprises an external laser source, so directed at the non-linear elements as to create a resonant cavity, thereby inducing an optical coupling between the non-linear elements.

11. An optical assembly for creating a synthetic aperture, comprising:
    at least two, spaced apart discrete elements, each having a predefined nonoverlapping viewfactor aperture positioned for receiving radiation outputted by an external source of at least partially coherent electromagnetic radiation, and each having properties which are affected nonlinearly by the radiation incident thereupon; and
    an optical feedback means, positioned relative to the non-linear elements to create a resonant cavity between the elements with respect to radiation incident from the source, for optically self-coupling the elements so that the elements collectively define a synthetic overlapping viewfactor aperture that is greater than the predefined nonoverlapping viewfactor apertures of the separate elements.

* * * * *

UNITED STATES PATENT AND TRADEMARK OFFICE
CERTIFICATE OF CORRECTION

PATENT NO. : 4,979,804
DATED : December 25, 1990
INVENTOR(S) : Jerold B. Lisson

It is certified that error appears in the above-identified patent and that said Letters Patent is hereby corrected as shown below:

Col. 2, line 22   after "invention", insert --.--;

Col. 3, line 11   delete "deposited" and substitute therefor --depicted--;

Col. 5, line 7    delete "4,846,578" and substitute therefor --4,846,575--;

Col. 5, line 18   delete "E in" and substitute therefor --$E_{in}$--.

Signed and Sealed this

Nineteenth Day of May, 1992

Attest:

DOUGLAS B. COMER

Attesting Officer

Acting Commissioner of Patents and Trademarks